Jan. 30, 1934.    W. G. BARTENFELD    1,944,914
MEANS FOR MAKING THE JOINTS BETWEEN STRUCTURAL MEMBERS WATER TIGHT
Filed March 6, 1931
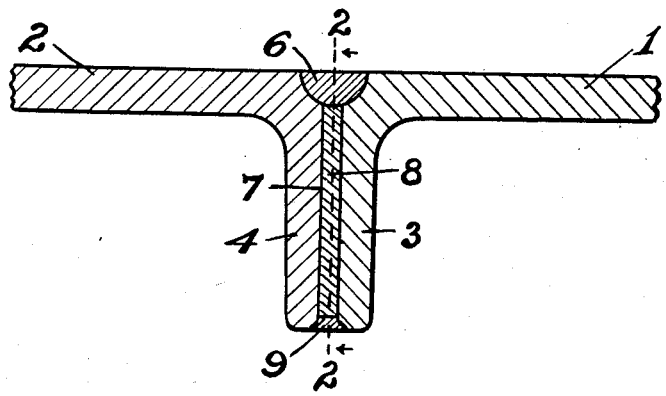
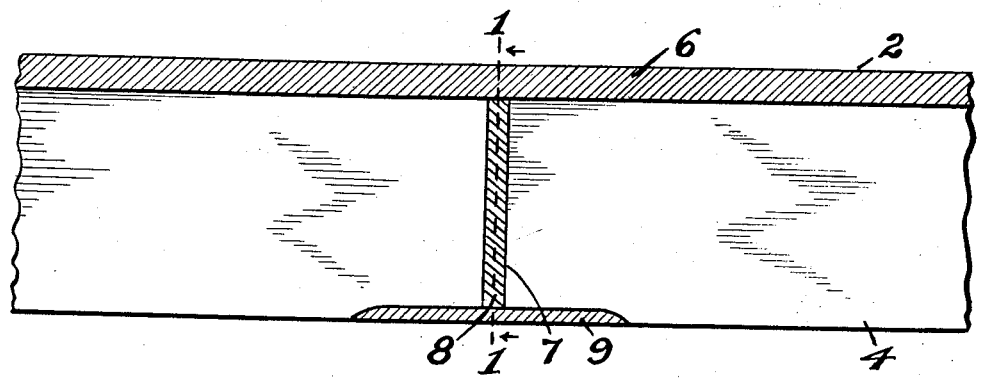
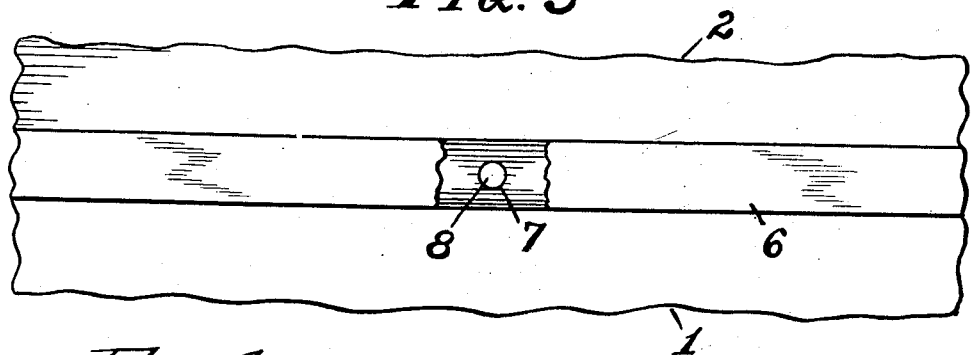
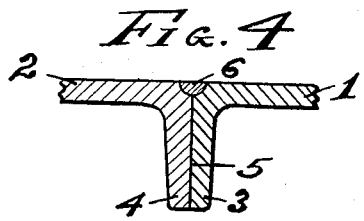
Inventor
W. G. Bartenfeld

UNITED STATES PATENT OFFICE 1,944,914

MEANS FOR MAKING THE JOINTS BETWEEN STRUCTURAL MEMBERS WATER TIGHT

Wilford G. Bartenfeld, Lorain, Ohio

Application March 6, 1931. Serial No. 520,689

1 Claim. (Cl. 189—36)

This invention relates to means for making the joints between the flanges of abutting channels water-tight, and has for its main object to provide simple and efficient means for making the seams between the flanges of standard steel channels water or oil tight when said channels are connected together in the construction of the hulls of vessels, bulkheads, tank tops, floors and other similar parts thereof or other steel structures. For a clear understanding of the invention, reference will be had to the accompanying drawing illustrating the same, and the novel features thereof will be particularly pointed out in the appended claim.

In the drawing, similar characters of reference are used to indicate corresponding parts.

Figure 1 is a cross sectional elevation, taken on line 1—1 of Fig. 2, illustrating a pair of channels with their flanges connected together and the joint made water or oil tight against transverse and longitudinal leakage in accordance with my invention, Fig. 2 is a longitudinal sectional elevation taken on line 2—2 of Figure 1, Fig. 3 is a partial plan view of Figure 1, the welding above the packing being omitted, Fig. 4 is a similar view to Figure 1 before the joint below the heel welding is packed against longitudinal leakage.

Referring to the drawing, 1 and 2 represent a pair of standard steel channels with their flanges 3 and 4 adjacent each other forming a joint 5, and said flanges are connected together by rivets, or welding or in any suitable manner. When channels are so used in the construction of vessels or any construction where the joint must be water or oil tight, this is accomplished in the manner now to be described.

The outer side or heel of the joint 5 is automatically welded, or if desired, caulked, for its full length, as indicated at 6. This makes the joint 5 between the flanges 3 and 4 of the channels 1 and 2 tight so that water or oil can not leak transversely through from one side of said channels to the other. Water or oil could however leak longitudinally through the joint 5 below or inside of the welding 6. In order to prevent said longitudinal leakage at certain points along the joint 5 as is necessary in many channel constructions, as for instance tank tops of vessels above the floor plates to prevent water passing from one tank to another, a hole 7 is drilled through said joint and said hole is filled with lead indicated by 8, or any other suitable metallic or non-metallic packing. The inner side or toe of the joint 5 is preferably welded across and for a short distance at each side of the packing 8, as indicated at 9. The hole 7 may be drilled entirely through the flanges 3 and 4 or terminate short of the toes thereof, and the welding 9 may be done before or after the filling of said hole with packing. The hole 7 through the welding 6 may be closed by the packing 8 or by spot welding over same.

From the description and drawing, it is seen that when channels or other flanged structural steel members are connected together by their flanges, the joint between the flanges for its entire length may be made water or oil tight against leakage transversely or in other words from one side of the channels to the other, and at certain points along the joint, also water and oil tight against leakage longitudinally through said joint.

Although the invention may be carried out as explained, it will be understood that it is applicable in many constructions and may be used with slight changes according to the particular job and within the scope of the claim.

Having fully described my invention, what I claim is:

In means for making the joints between flanged structural members water-tight, the combination of flanged structural members, the flanged structural members being connected together at their flanges, the joint at the heel of said flanges being welded for its entire length to prevent leakage, packing fixed in said joint at a certain transverse point, the packing extending from said welding and short of the toes of said flanges, and the joint at the toes of said flanges and opposite said packing being welded for a short distance at each side thereof.

WILFORD G. BARTENFELD.